March 23, 1937. P. J. MURPHY 2,074,414
BEVERAGE CONTAINER
Filed Nov. 2, 1933
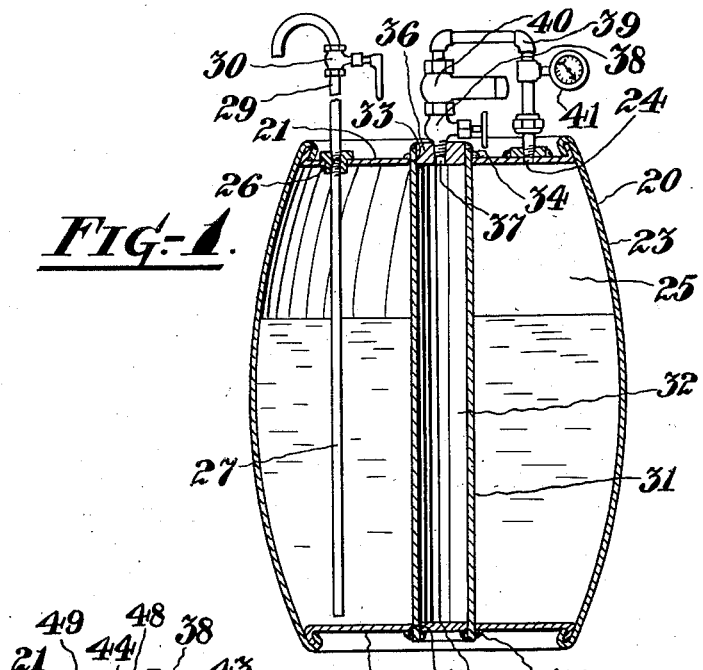
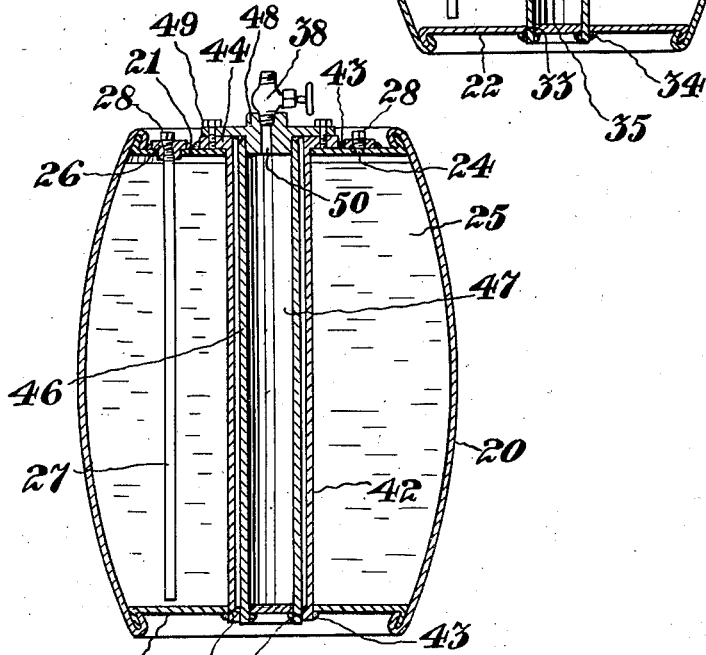
INVENTOR.
Patrick J. Murphy.
BY
HIS ATTORNEY.

Patented Mar. 23, 1937

2,074,414

UNITED STATES PATENT OFFICE 2,074,414

BEVERAGE CONTAINER

Patrick J. Murphy, Chicago, Ill., assignor to Ingersoll-Rand Company, Jersey City, N. J., a corporation of New Jersey Application November 2, 1933, Serial No. 696,328

3 Claims. (Cl. 225—18)

This invention relates to containers, and more particularly to beverage containers of the type employed for storing and shipping the beverage in bulk and from which the beverage is expelled by fluid under pressure.

One object of the invention is to assure an adequate supply of a suitable fluid or gas under pressure to forcibly eject the beverage content from the container.

Another object is to construct a two chambered container in which the walls of the inner chamber serve to reinforce the ends of the outer chamber.

A further object is to provide a form of beverage container to which a portable source of fluid impellent such as compressed $CO_2$ may be readily attached for delivering the contents of the container.

Other objects will be in part obvious and in part pointed out hereinafter.

In the accompanying drawing illustrating the invention and in which similar reference numerals refer to similar parts, Figure 1 is an elevation, in section, of a beverage container constructed in accordance with the practice of the invention, and Figure 2 is a similar view showing a modified form of the invention.

Referring more particularly to the drawing, the container designated in its entirety by 20, is shown as being in the form of a barrel having sunken end heads 21 and 22 which may be secured to the ends of the wall 23 of the barrel in any suitable and well known manner.

At one end of the container, as for instance in the head 21, is an opening 24 through which the beverage may be introduced into the beverage chamber 25. Preferably in the same head is an outlet opening 26 having threaded thereto a discharge pipe 27 which extends through the chamber 25 to a point closely adjacent the head 22.

The outer ends of the openings 24 and 26 are also threaded for the accommodation of plugs 28 which seal the chamber 25 after filling. When it is desired to draw the beverage from the container the plugs 28 are removed and replaced by devices adapted to introduce impellent into the chamber 25 and to conduct the beverage from the container. In the present instance a tube 29 is shown threaded into the outlet opening 26 and a faucet 30 in the tube 29 controls the flow of beverage through the tube.

In accordance with the practice of the invention the container 20 is provided with a tank or casing 31 of which the interior serves as a reservoir 32 for a beverage impellent, such as carbon dioxide gas under pressure or compressed air, whereby the beverage may be expelled from the chamber 25. The casing 31 may be of tubular form and is preferably arranged coaxially of the container 20 through which it extends. The casing is of less length than the container so that its ends lie inside of the ends of the container and the ends of the casing are seated in apertures 33 in the heads 21 and 22 and are secured to the heads by welding, as indicated at 34.

In the lower and upper ends of the casing 31 are heads 35 and 36, respectively, which may be welded to the casing 31, and in the head 36 is an outlet opening 37 of which the outer end is threaded to accommodate a valve 38 which controls the flow of impellent from the reservoir 32. A conduit 39, connected to the valve 38 and to the opening 24, upon removal of the plug 28 from said opening, serves to convey the fluid under pressure from the reservoir 32 into the chamber 25. A reducing valve 40 is interposed in the conduit 39 to assure the correct pressure within the chamber 25, and a gauge 41, also in the conduit 39, indicates the value of the pressure to which the beverage in the chamber 25 is subjected.

In the modified form of the invention illustrated in Figure 2 the heads 21 and 22 of the container 20 are also provided with central apertures 33 to receive the ends of an open ended tube 42 which is secured to the heads 21 and 22, as by welding as indicated at 43. At one end of the tube 42 is an external lateral flange 44 which seats upon the head 21, and in the opposite end of the tube 42 is a surface 45 to guide an end of a tank or casing 46 of which the interior serves as a reservoir 47 for a beverage impellent. On the upper end of the tank 46 is a flanged head 48 which seats upon the flange 44 and bolts 49 extending through the head 48 are threaded into the flange 44 to secure the casing 46 to the container 20. The head 48 is also provided with an outlet opening controlled by a valve 38 for discharging the impellent from the reservoir 47.

In practice, the chamber 25 and the reservoir 32 are filled at the place of manufacture with the beverage and the beverage impellent, respectively. After sealing the chamber 25 and the reservoir 32 by means of the plugs 28 and the valve 30 the container is in readiness for shipment. Whenever it is desired to dispense of the contents of the chamber 25 the conduit 29 is connected to the outlet opening 26 and the conduit 39 is secured to the valve 38 and the opening 24. By opening the valve 38 and suitably adjusting the reducing valve 40 pressure fluid will enter the container to expel the beverage through the conduits 27 and 29, upon opening of the valve 30.

In such cases as where the beverage impellent is stored within a separate tank, such as the casing 46, the casing and the container 20 may be transported as separate units and the casing 46 is attached to the container at the place of consumption.

As will be readily appreciated, by providing the container with a storage reservoir containing the impellent used for forcing the beverage from the chamber 25 the beverage may be conveniently dispensed without requiring costly equipment at the place of distribution. It will, moreover, be obvious that by supplying the container with the impellent at the place of manufacture, such as the brewery, and, therefore, under the most sanitary conditions there will be little or no likelihood of contaminating substances being introduced into the beverage.

I claim:

1. A container for beverages, heads for the container having apertures therein, a tube in the container and the apertures and being permanently secured to the heads to effect a seal between the tube and the heads, a guide surface in one end of the tube, a casing for a beverage impellent within the tube and being guided at one end by the guide surface, a flange on the other end of the casing, and bolts extending through the flange for securing the casing to the container.

2. In a container for beverages, heads thereon having apertures therein, a tube connecting said apertures and projecting therethrough and molecularly united to the heads, closures for the tube within the tube cooperating with the tube to form a container for an impellent, and means to conduct the impellent from its container to the beverage container to expel the beverage therefrom.

3. The combination of a beverage container having an axial tube extending therethrough and integrally united therewith, a cylindrical impellent reservoir enclosed in said tube, guide means in the tube to support the impellent reservoir against lateral displacement, means to secure the impellent reservoir to the beverage container, and means to connect the reservoir to the container to conduct the impellent from the former to the latter.

PATRICK J. MURPHY.